United States Patent [19]

Aiso et al.

[11] Patent Number: 5,549,015

[45] Date of Patent: Aug. 27, 1996

[54] SHAFT ROTATION DRIVING APPARATUS FOR MACHINE TOOL

[75] Inventors: Katsuyosi Aiso; Sakasi Adati; Tosihiro Igarasi; Sin Tanoue; Satosi Kumamoto, all of Shizuoka-ken; Masanori Wakuda, Shimogawara Numazu, all of Japan

[73] Assignee: Toshiba Kikai Kabushiki Kaisha, Tokyo, Japan

[21] Appl. No.: 160,729

[22] Filed: Dec. 2, 1993

[30] Foreign Application Priority Data

Dec. 4, 1992 [JP] Japan ..................... 4-325211

[51] Int. Cl.⁶ ........................................ F16H 1/20
[52] U.S. Cl. ................ 74/424.8 B; 74/424.8 R; 310/80; 310/112
[58] Field of Search ............... 74/424.8 B, 424.8 R; 310/80, 112, 156, 168, 263

[56] References Cited

U.S. PATENT DOCUMENTS 3,278,774  10/1966  Roller et al. ................... 310/80
3,321,652  5/1967  Opel ............................. 310/263
5,193,953  3/1993  Jesinger ......................... 409/231

FOREIGN PATENT DOCUMENTS 8810092.8   11/1988  Germany.
3834140A1   4/1990   Germany.
4025610A1   2/1992   Germany.
WO92/01532  2/1992   WIPO.

Primary Examiner—Rodney H. Bonck
Assistant Examiner—Chong H. Kim
Attorney, Agent, or Firm—Finnegan, Henderson, Farabow, Garrett & Dunner, L.L.P.

[57] ABSTRACT

A shaft rotation driving apparatus for a machine tool having a main spindle for rotating a tool or a workpiece, comprises: a magnetic anisotropic rotor formed integral with the main spindle itself or with a rotary sleeve itself fitted to the main spindle; a stator disposed coaxially along an outer circumference of the magnetic anisotropic rotor; a field winding wound around the stator, for magnetizing the rotor in a predetermined direction; and an armature winding wound around the stator, for providing a rotative force to the rotor.

2 Claims, 6 Drawing Sheets

SHAFT ROTATION DRIVING APPARATUS FOR MACHINE TOOL

BACKGROUND OF THE INVENTION

1. Field of the Invention

The present invention relates to a shaft rotation driving apparatus for a machine tool, and more specifically to a shaft rotation driving apparatus for rotating a main spindle or a rotary sleeve fitted to the main spindle, or a shaft rotation driving apparatus for a machine tool including a feed device for moving a movable carriage linearly through a feed screw mechanism or a worm mechanism, etc.

2. Description of the Related Art

As a shaft rotation driving apparatus for a machine tool for rotating a tool or a workpiece to be processed (e.g., for cutting or grinding), there has been so far known such a rear-end motor type spindle rotation driving apparatus that a main spindle rotation driving motor is attached to the rear portion of the main spindle.

In the conventional main spindle rotation driving apparatus of this rear-end motor type, however, since the main spindle rotation driving motor is arranged on the rear side of the main spindle, the axial length of the main spindle apparatus is inevitably increased, with the result that the external shape of the machine tool becomes large when the main spindle apparatus of this type is incorporated in the machine tool. In addition, since the main spindle rotation driving motor is provided at the rear side of the main spindle, there exists a problem in that the rear end side of the main spindle is not open so that it is impossible to assemble a holding device (e.g., a collet chuck for holding a tool) to the main spindle.

Further, a built-in motor type spindle rotation driving apparatus is so far known such that a hollow rotary shaft (sleeve) (to which a rotor is shrinkage fit) is fixed to a main spindle with the use of a key and additionally a wedge ring. On the other hand, a stator is fixed to a main spindle supporting body for rotatably supporting the main spindle.

In the above-mentioned built-in type spindle rotation driving apparatus, although the problem involved in the rear-end motor type can be solved, since the rotor is shrinkage fit to the rotor shaft, an additional processing is required to remove the thermal deformation generated after shrinkage fit processing. Further, when the rotor is provided with a winding coil, since heat is inevitably generated, the temperature of the main spindle rises, thus deteriorating the machining precision by the heat generated by the winding coil. In addition, since the rotor shaft is fixed to the main spindle with the use of the wedge ring, there exists another problem in that the frictional coupling is not stable. Further, in the case where the rotor is a synchronous motor composed of a plurality of combined permanent magnets or a squirrel cage induction motor, there exists another problem in that the maximum rotative speed of the main spindle must be restricted under due consideration of a limitation of breakdown caused by the centrifugal force of the rotating rotor. In addition, in this built-in type motors, since the internal structure is not uniform, there exists other shortcomings that the motor cannot be well balanced in dynamic condition; in particular at high rotative speed. Further, in the spindle rotation driving apparatus of built-in type motor, the composing parts are complicated in shape, and therefore a long assemble and disassemble time is required, thus resulting in a complicated maintenance.

Further, there exists such a quill type spindle rotation driving apparatus that the main spindle itself is fed in the axial direction within a quill by a feed screw shaft rotated by an axial feed motor. In this quill type spindle rotation driving apparatus, on the other hand, the main spindle is rotated by an externally arranged main spindle motor, irrespective of the axial movement of the main spindle. That is, a driven gear rotatably supported by the quill so as not to be moved in the axial direction thereof is fixed to the main spindle via a slide key or splines, and a drive gear driven by the main spindle motor is geared with this driven gear fixed to the main spindle.

In the above-mentioned quill type spindle rotation driving apparatus provided with a feed mechanism, since the main spindle itself is moved in the axial direction thereof by the axial feed motor, it is unnecessary to feed the quill. Further, it is possible to move the main spindle in various ways by combinations of the main spindle feed motion and the quill feed motion. In the spindle rotation driving apparatus of this quill type, however, since the main spindle must be rotated by an external rotating force at any axial feed positions of the main spindle, a key groove long enough to extend over the feed stroke of the main spindle or a sliding transmission mechanism such as spline must be formed in the main spindle, with the result that the mechanical strength of the main spindle is lowered and further the dynamic balancing of the main spindle is deteriorated. In addition, since the main spindle is driven externally, an additional power transmission mechanism such as gear train is required for the motor drive system, thus causing a power loss in the power transmission. Further, since the axial feed motor for rotating the feed screw must be arranged on the rear side of the main spindle, there exists another problem in that the axial length of the main spindle is long and thereby the external shape of the machine tool is large when the main spindle rotation driving apparatus of this type is incorporated in the machine tool.

Further, as a feed device for a machine tool for linearly moving a movable carriage such as a work table, there have been so far known a feed screw mechanism and a worm mechanism.

In the case of the feed screw mechanism, there exists such a type that the feed device is composed of a feed nut member fixed to a movable carriage and a feed screw shaft geared with the feed nut member, and the movable carriage is moved linearly in an axial direction of the feed screw shaft when the feed screw shaft geared with the feed nut member is rotated by an external drive motor connected to the feed screw shaft via a coupling.

In the above-mentioned conventional feed screw mechanism, since the feed screw shaft is connected to and driven by the external drive motor via the coupling, there exists a problems in that the number of parts increases. Further, since the external drive motor is attached to the rear end portion of the feed screw shaft, the size of the mechanism is large. Further, when the feed screw shaft and an external drive motor shaft are not aligned strictly relative to each other, rotative vibration is easily generated and thereby the feed precision of the movable carriage is deteriorated. Further, when the dimension of the feed screw shaft increases, since the inertia thereof increases, it becomes difficult to control the location of the movable carriage at high precision.

Further, there exists another feed screw mechanism such that the feed device is composed of a feed nut member rotatably attached to a movable carriage and a fixed feed screw shaft geared with the feed nut member, and the movable carriage is moved linearly in an axial direction of the feed screw shaft when the feed nut member geared with the feed screw shaft is rotated by a motor mounted on the movable carriage.

In the above-mentioned feed nut mechanism, since the drive motor is arranged on the side of the feed nut member and further the feed nut member must be connected to and driven by the drive motor, the number of parts also inevitably increases. Further, since the drive motor is mounted on the movable carriage, a relatively large space is required for the movable carriage.

Further, in the case of the worm mechanism, the feed device is composed of a worm rack member attached to a movable carriage so as to extend linearly and a worm geared with the worm rack member, and the movable carriage is moved linearly along an extending direction of the worm rack member when the worm geared with the worm rack member is rotated by an external drive motor.

In the conventional worm mechanism, since the external drive motor for driving the worm is additionally mounted separately on one end of the worm along the axial direction thereof, the worm and the motor output shaft must be aligned accurately, and further a relatively large space is required for mounting the external driving motor.

SUMMARY OF THE INVENTION

With these problems in mind, therefore, the object of the present invention is to provide a shaft rotation driving apparatus for a machine tool, which is short in the axial length, small in the number of composing parts, simple and stable in structure, easy to assemble and disassemble and thereby easy to achieve the maintenance, excellent in dynamic balance at high rotative speed, small in size, without requiring a large motor mounting space, without use of any coupling and any power transmission mechanism such as a sliding groove or a gear mechanism for transmitting a rotative force to the main spindle, in spite of the fact that the main spindle itself is moved in the axial direction thereof, and without requiring any axial alignment between a motor output shaft and a driven shaft such as feed screw shaft, that is, which is particularly suitable for designing a small-sized shaft rotation driving apparatus for a machine tool.

To achieve the above-mentioned object, the present invention provides a shaft rotation driving apparatus for a machine tool having a main spindle for rotating a tool or a workpiece, comprising: a rotor formed integral with the main spindle itself or with a rotary sleeve itself fitted to the main spindle, said rotor being of magnetic anisotropy; a stator disposed coaxially along an outer circumference of said rotor; a field winding wound around said stator, for magnetizing said rotor in a predetermined direction; and an armature winding wound around said stator, for providing a rotative force to said rotor.

In the above-mentioned construction, since a main spindle rotation driving motor having the main spindle or the rotary sleeve itself as a magnetic anisotropic rotor is constructed around an axis of the main spindle or the rotary sleeve, the main spindle or the rotary sleeve can be directly rotated and driven by the main spindle rotation driving motor. Therefore, it is possible to reduce the axial length of the main spindle, eliminate the use of an additional key for fixing the rotor to the main spindle or the rotary sleeve, to decrease the number of composing elements, to simplify the construction, and to provide an excellent assembly, disassembly and maintenance.

Further, since the rotor is of magnetic anisotropy, no winding is wound around the rotor, so that no heat is generated by the rotor. Consequently, the main spindle will not be heated and therefore is free from a change in temperature, with the result that a mechanical precision can be maintained, an excellent balance can attained even at high speed rotation due to uniformity of the rotor, and thereby the maximum speed of the main spindle can be also increased.

In the preferred embodiment of the present invention, the main spindle is disposed movably relative to said stator in an axial direction thereof, and said rotor is formed extending over a length corresponding to a movement stroke of the main spindle.

Since the rotor formed integral with the main spindle or the rotary sleeve is formed extending over an axial length corresponding to the axial movement stroke of the main spindle or the rotary sleeve, even if the main spindle or the rotary sleeve is moved in the axial direction thereof, the above-mentioned main spindle rotation driving motor is kept constructed, so that it is possible to directly rotate the main spindle or the rotary sleeve, irrespective of the axial movement of the main spindle or the rotary sleeve.

Consequently, even when the main spindle is of feed movement type in the axial direction, any slide transmission mechanism such as slide key, splines, etc. or any power transmission mechanism such as gears is required to transmit a rotative force from the rotor to the main spindle or the rotary sleeve, during the axial feed motion of the main spindle or the rotary sleeve, so that it is possible to rotate and drive the main spindle at high efficiency.

Further, present invention provides a spindle rotation driving apparatus for a machine tool having a main spindle for rotating a tool or a workpiece, comprising: a first rotor formed integral with the main spindle itself or with a rotary sleeve itself fitted to the main spindle, said first rotor being of magnetic anisotropy; a first stator disposed coaxially along an outer circumference of said first rotor; a first field winding wound around said first stator, for magnetizing said first rotor in a predetermined direction; a first armature winding wound around said first stator, for providing a rotative force to said first rotor; a feed screw axle portion disposed formed integral with the main spindle or the rotary sleeve; a second rotor having a feed nut geared with said feed screw axle portion, said second rotor being of magnetic anisotropy; a second stator disposed coaxially along an outer circumference of said second rotor; a second field winding wound around said second stator, for magnetizing said second rotor in a predetermined direction; and a second armature winding wound around said second stator, for providing a rotative force to said second rotor.

In the preferred embodiment of the present invention, the main spindle is disposed movably relative to said first stator in an axial direction thereof, and said first rotor is formed extending over a length corresponding to a movement stroke of the main spindle.

In the above-mentioned construction, the axle feed motor having the feed nut member itself as a magnetic anisotropic rotor is constructed around the feed screw shaft, and the feed nut member is directly rotated and driven by the axle feed motor. Therefore, it is possible to move the main spindle or the rotary sleeve in axially forward or reverse direction on the basis of a difference in number of revolutions between the feed nut member rotated by the axle feed motor and the main spindle or the rotary sleeve rotated by the main spindle rotation driving motor.

Accordingly, since the main spindle or the rotary sleeve can be directly driven by the axle feed motor, it is possible to feed the main spindle or the rotary sleeve in the axial direction at high precision and further to finely adjust the axial feed speed of the main spindle or the rotary sleeve qualitatively on the basis of the difference in revolution speed between the axle feed motor and the main spindle rotation driving motor.

Further, the present invention provides a shaft rotation driving apparatus for a machine tool having a feed device composed of a feed nut member fixed to a movable carriage and a feed screw shaft geared with the feed nut member, the movable carriage being moved linearly in an axial direction of the feed screw shaft when the feed screw shaft geared with the feed nut member is rotated, comprising: a rotor formed integral with the feed screw shaft itself, said rotor being of magnetic anisotropy; a stator disposed coaxially along an outer circumference of said rotor; a field winding wound around said stator, for magnetizing said rotor in a predetermined direction; and an armature winding wound around said stator, for providing a rotative force to said rotor.

Further, the present invention provides a shaft rotation driving apparatus for a machine tool having a feed device composed of a feed nut member rotatably attached to a movable carriage and a fixed feed screw shaft geared with the feed nut member, the movable carriage being moved linearly in an axial direction of the feed screw shaft when the feed nut member geared with the feed screw shaft 1s rotated, comprising: a rotor formed integral with the feed nut member itself, said rotor being of magnetic anisotropy; a stator disposed coaxially along an outer circumference of said rotor; a field winding wound around said stator, for magnetizing said rotor in a predetermined direction; and an armature winding wound around said stator, for providing a rotative force to said rotor.

Further, the present invention provides a shaft rotation driving apparatus for a machine tool having a feed device composed of a worm rack member attached to a movable carriage so as to extend linearly and a worm geared with the worm rack member, the movable carriage being moved linearly along an extending direction of the worm rack member when the worm geared with the worm rack member is rotated, comprising: a rotor formed integral with the worm itself, said rotor being of magnetic anisotropy; a stator disposed coaxially along an outer circumference of said rotor; a field winding wound around said stator, for magnetizing said rotor in a predetermined direction; and an armature winding wound around said stator, for providing a rotative force to said rotor.

In the above-mentioned constructions, since the motor having the feed screw shaft or the feed nut member or the worm axle portion itself as the magnetic anisotropic rotor is constructed around the feed screw shaft or the feed nut member or the worm axle portion, the feed screw shaft or the feed nut member or the worm can be directly rotated and driven by the motor.

Consequently, since it Is unnecessary to couple the motor to the feed screw shaft, etc., the number of parts can be reduced, the alignment work between the motor and the rotated member such as the feed screw shaft, etc. can be eliminated, and thereby the feed motion of the movable carriage can be maintained at high precision without generating rotational vibration due to misalignment between the two.

Further, since no large space is required for arranging the motor, it is possible to increase the freedom of designing a smaller-sized machine tool.

Further, since the axial length of the feed screw shaft can be reduced, the inertia of the feed screw shaft can be also decreases, so that it is possible to control the positioning of the movable carriage at high precision.

DETAILED DESCRIPTION OF THE PREFERRED EMBODIMENTS

The embodiments of the present invention will be described hereinbelow in detail with reference to the attached drawings.

(First Embodiment)

Figure 1:
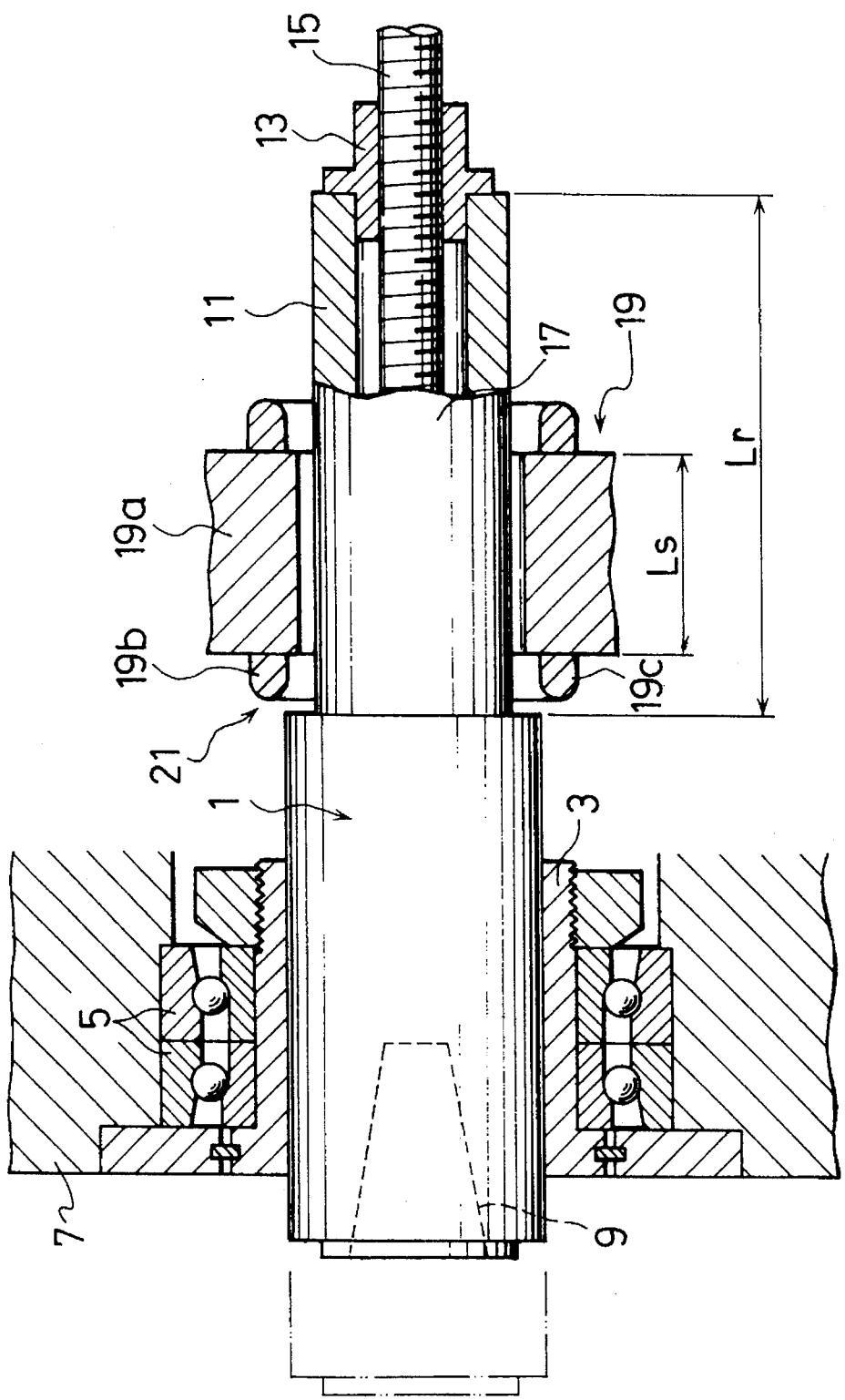
FIG. 1 is a diagrammatical cross-sectional view showing a first embodiment, in which the shaft rotation driving apparatus for a machine tool according to the present invention is applied to a main spindle apparatus.

FIG. 1 shows a first embodiment, in which the shaft rotation driving apparatus according to the present invention is applied to a main spindle apparatus for a machine tool. In the drawing, a main spindle 1 is rotatably supported by a bearing sleeve 3 so as to be movable in the axial direction thereof. Further, the bearing sleeve 3 is rotatably supported by a fixed member 7 via two bearings 5.

The main spindle 1 is formed with a tool fixing portion 9 on one end portion (the left end in FIG. 1) thereof and with a hollow axle portion 11 on rear end portion (the right end in FIG. 1) thereof. A ball nut member 13 is attached to the rear end hollow axle portion 11 of the mains spindle. A ball screw shaft 15 is in mesh with this ball nut member 13 coaxially with the main spindle 1. The ball screw shaft 15 is rotated by an external drive motor (not shown) to feed the main spindle 1 in the axial direction thereof through the engagement between the ball nut member 13 and the ball screw shaft 15.

On the other hand, the rear end axle portion 11 of the main spindle 1 itself is formed as a magnetic anisotropic rotor 17 provided with magnetic anisotropic characteristics (e.g., magnetic anisotropic slits are formed). Here, since the magnetic anisotropic rotor 17 is the axle portion of the main spindle 1 itself, which is excellent in uniformity of mass of the main spindle 1.

Further, a stator 19 is fixedly disposed coaxially along an outer circumference of the rotor; that is, at such a position as to enclose the magnetic anisotropic rotor 17 coaxially, so that a synchronous main spindle rotation driving motor 21 can be constructed by the magnetic anisotropic rotor 17 and the stator 19.

The stator 19 is provided with an iron (magnet) core 19a, an armature winding 19b, and a field winding 19c (magnetizing means) for magnetizing the magnetic anisotropic rotor 17.

The axial length Lr of the magnetic anisotropic rotor 17 is determined longer than the axial length Ls of the stator 19. Accordingly, the magnetic anisotropic rotor 17 is always enclosed by the stator 19 coaxially, irrespective of the axial position of the main spindle 1, thus maintaining the construction of the main spindle rotation driving motor 21, even if the main spindle 1 is moved along the axial direction thereof.

In the above-mentioned construction of the main spindle rotation driving apparatus, since the spindle rotation driving motor 21 having the main spindle 1 itself as the magnetic anisotropic rotor 13 is constructed around the axis of the main spindle 1, the main spindle 1 is directly rotated and driven by this spindle rotation driving motor 21.

Further, since the axial length of the magnetic anisotropic rotor 17 is determined long enough to be enclosed by the stator 19 coaxially, irrespective of the axial movement position of the main spindle 1, the construction of the spindle rotation driving motor 21 can be maintained even if the main spindle 1 is moved to any position in the axial direction thereof. Consequently, the main spindle 1 can be directly rotated and driven by this spindle rotation driving motor 21 at any axial position of the main spindle 1 relative to the stator 19.

Here, the principle of the synchronous spindle rotation driving motor 21 adopted for the apparatus of the present invention will be explained with reference to FIG. 9.

Figure 9:
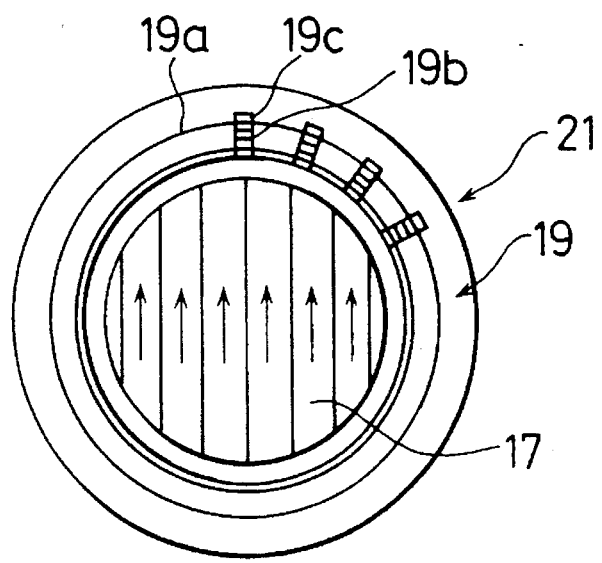
FIG. 9 an illustration for assistance in explaining the principle of the motor provided for the shaft rotation driving apparatus for a machine tool according to the present invention.

In FIG. 9, the magnetic anisotropic rotor 17 is formed of a substance of magnetic anisotropy. As the metal of the magnetic anisotropic substance, there are a grain oriented silicon steel, a grain oriented nickel, etc., for instance. Further, it is also possible to form the magnetic anisotropic rotor 17 of a magnetic isotropic substance into a salient pole shape. The magnetic anisotropic rotor 17 formed as described above is provided with such characteristics as to be magnetized easily in the arrow direction in FIG. 9 but not magnetized easily in the direction perpendicular to the same arrow direction.

In the synchronous spindle rotation driving motor 21 as described above, three-phase alternating current is passed through the field winding 19c and the armature winding 19b in such a way that the field winding current is out of phase from the armature winding current by a predetermined phase angle (e.g., 90 degrees). Since the magnetic anisotropic rotor 17 is magnetized in a predetermined direction by a magnetic flux generated by the field winding current, a torque can be generated in the rotor 17 in cooperation with the armature winding current on the basis of Fleming's rule.

In the spindle rotation driving motor 21 as described above, it is possible to obtain an extremely stable rotation, because the magnetic anisotropic rotor 17 is simple in structure without use of any permanent magnet, and further well balanced without being subjected to any magnetic vibration. In addition, since the magnetic anisotropic rotor 17 is provided with no winding, no heat is generated by the rotor 17. Further, since the rotor 17 can be formed of a metal of magnetic anisotropic substance, the rotor 17 can be formed into any desired shape. When formed into a circular in cross section, the magnetic anisotropic rotor 17 can be rotated at high speed.

(Second Embodiment)

Figure 2:
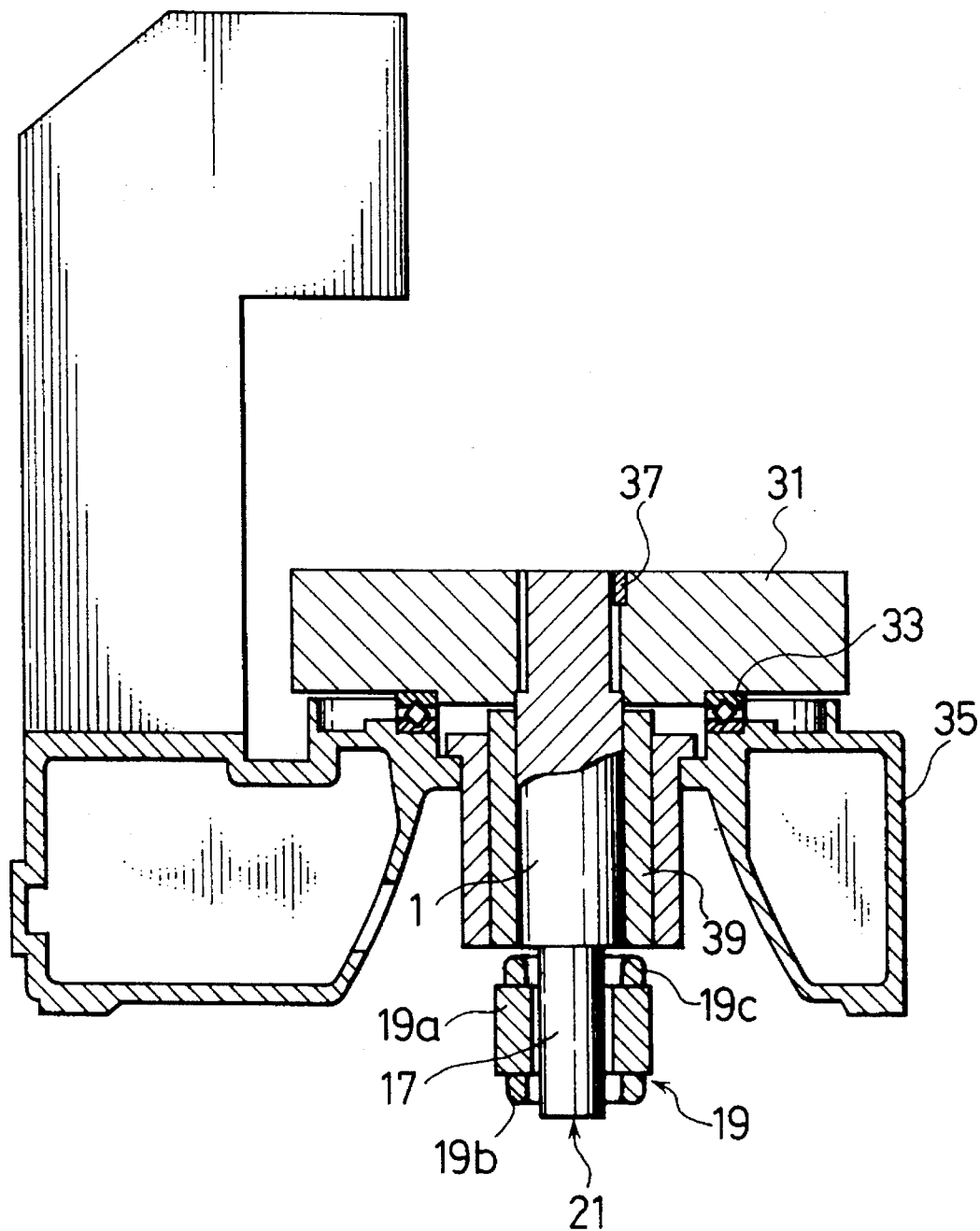
FIG. 2 is a diagrammatical cross-sectional view showing a second embodiment, in which the shaft rotation driving apparatus for a machine tool according to the present invention is applied to a main spindle apparatus for driving a rotary table of a vertical lathe.

FIG. 2 shows a second embodiment, in which the shaft rotation driving apparatus according to the present invention is applied to a main spindle apparatus for driving a rotary table of a vertical lathe. Further, in FIG. 2, the same reference numbers have been retained for the similar parts or elements which have the same functions as with the case of the first embodiment shown in FIG. 1.

In FIG. 2, a rotary table 31 is rotatably supported on a bed 35 via a plurality of cross rollers 33 about a vertical axle of the rotary table 31. At the center of the rotary table 31, the main spindle 1 (as a vertical axle) is fixed to the rotary table 31 by use of a key 37. Further, the main spindle 1 is also rotatably supported by the bed 35 via a bearing 39. The lower end portion of the main spindle 1 itself is formed as the magnetic anisotropic rotor 17.

In this second embodiment, a stator 19 is fixedly disposed coaxially along an outer circumference of the rotor, that is, at such a position as to enclose the magnetic anisotropic rotor 17, so that a synchronous spindle rotation driving motor 21 can be constructed by the magnetic anisotropic rotor 17 and the stator 19 in the same way as with the case of the first embodiment shown in FIG. 1.

Therefore, since the spindle rotation driving motor 21 having the main spindle 1 itself as the magnetic anisotropic rotor 17 is constructed around the axis of the main spindle 1, the main spindle 1 fixed to the rotary table 31 can be directly rotated by the spindle rotation driving motor 21.

(Third Embodiment)

Figure 3:
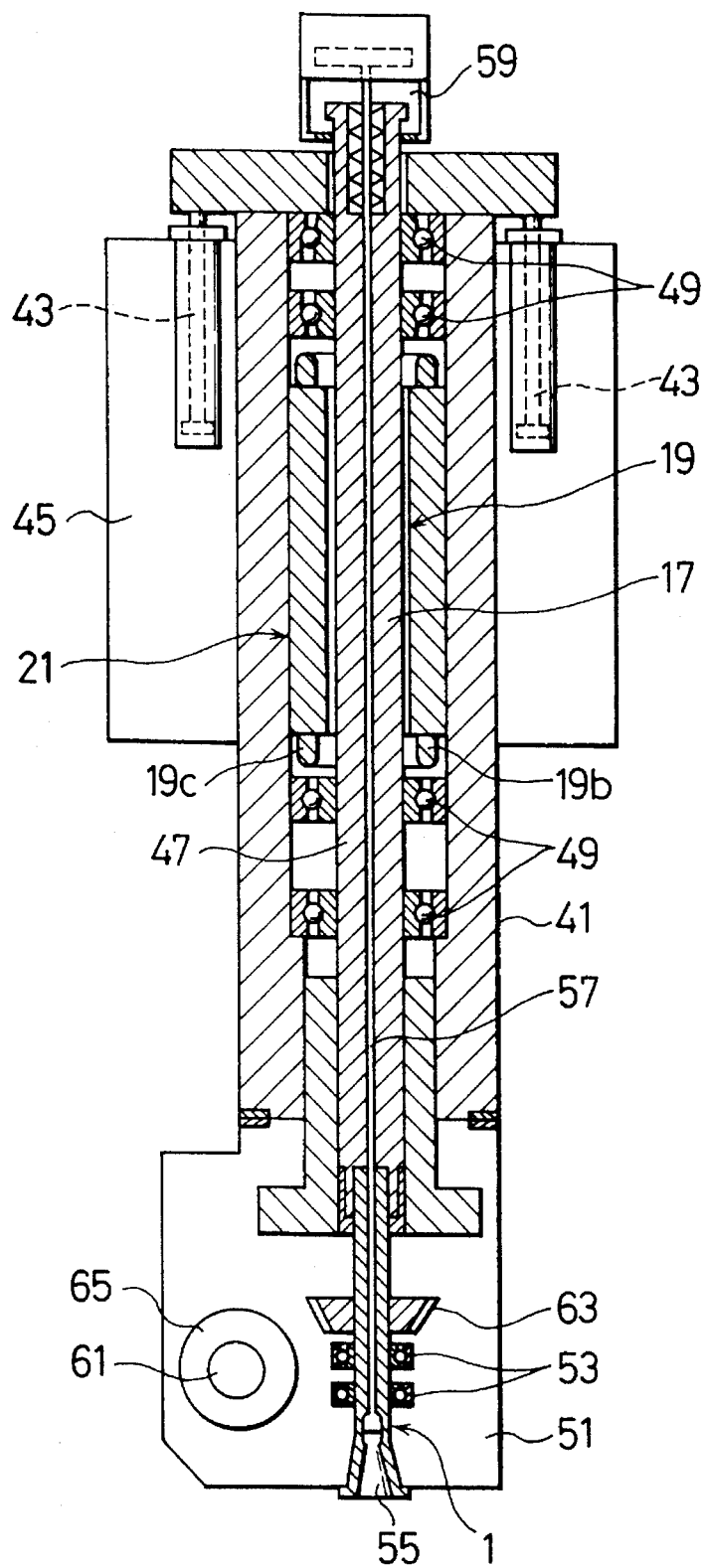
FIG. 3 is a diagrammatical cross-sectional view showing a third embodiment, in which the shaft rotation driving apparatus for a machine tool according to the present invention is applied to a main spindle apparatus for a portal machining center.

FIG. 3 shows a third embodiment, in which the shaft rotation driving apparatus according to the present invention is applied to a main spindle apparatus for a portal machining center. Further, in FIG. 3, the same reference numbers have been retained for the similar parts or elements which have the same functions as with the case of the first embodiment shown in FIG. 1.

In FIG. 3, a saddle portion 45 of a rotary sleeve supporting cylinder 41 is supported by a plurality of balancing cylinder devices 43 in the upward direction. The rotary sleeve supporting cylinder 41 rotatably supports a rotary sleeve 47 via a plurality of bearings 49. A main spindle supporting body 51 is attached to the lower end portion of the rotary sleeve supporting cylinder 41 so as to rotatably support a main spindle 1 by two bearings 53. Further, the rotary sleeve 47 is fitted to the main spindle 1 to rotate the main spindle 1 together therewith.

An operating axle 57 of a collet chuck 55 formed at the lower end portion of the main spindle 1 is provided passing through the rotary sleeve 47 and the main spindle 1 in the axial direction thereof. The operating axle 57 1s connected to and driven by a hydraulic chuck driving cylinder device 59 attached to the upper end of the rotary sleeve 47.

Further, a sub-axle 61 is provided for the main spindle supporting body 51 in linkage with the main spindle 1 through the bevel gears 63 and 65 so as to be driven by the main spindle 1. The rotary sleeve 47 itself is formed as the magnetic anisotropic rotor 17.

In this third embodiment, the stator 19 is fixedly disposed coaxially along the outer circumference of the magnetic anisotropic rotor 17 at such a position as to enclose the rotor 17, so that a synchronous spindle rotation driving motor 21 can be constructed by the magnetic anisotropic rotor 17 and the stator 19 in the same way as with the case of the first and second embodiments.

Therefore, since the spindle rotation driving motor 21 having the rotary sleeve 47 itself as the magnetic anisotropic rotor 17 is constructed around the axis of the rotary sleeve 47, the main spindle 1 can be directly rotated by the rotary sleeve 47 of the spindle rotation driving motor 21.

(Fourth Embodiment)

Figure 4:
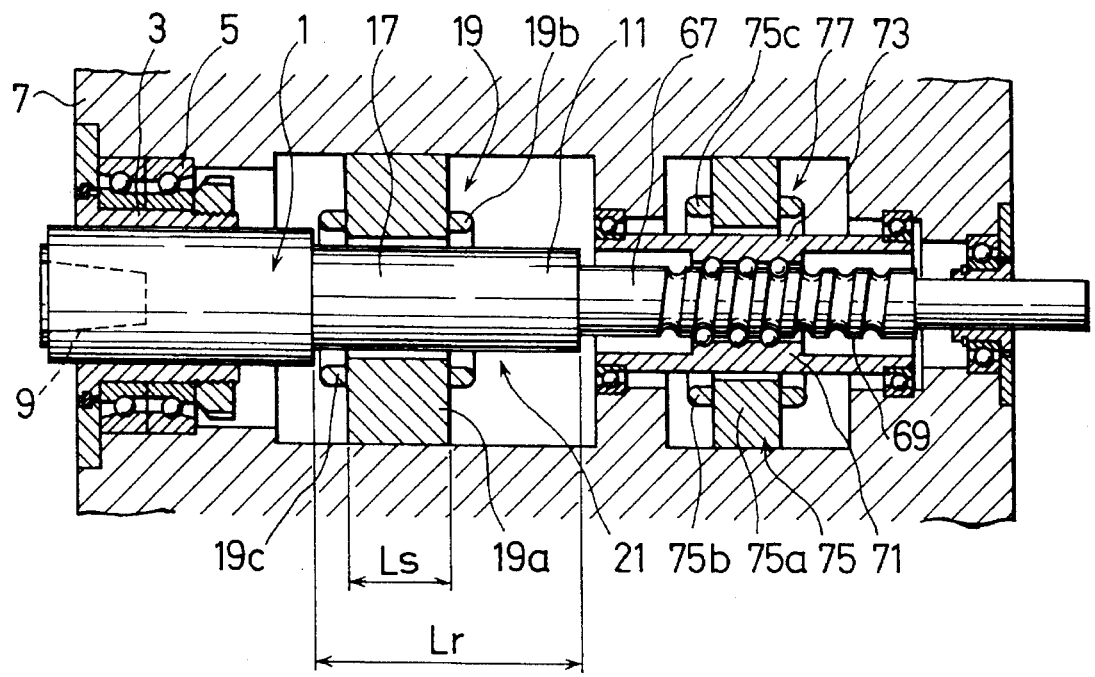
FIG. 4 is a diagrammatical cross-sectional view showing a fourth embodiment, in which the shaft rotation driving apparatus for a machine tool according to the present invention is applied to a main spindle apparatus.
Figure 5:
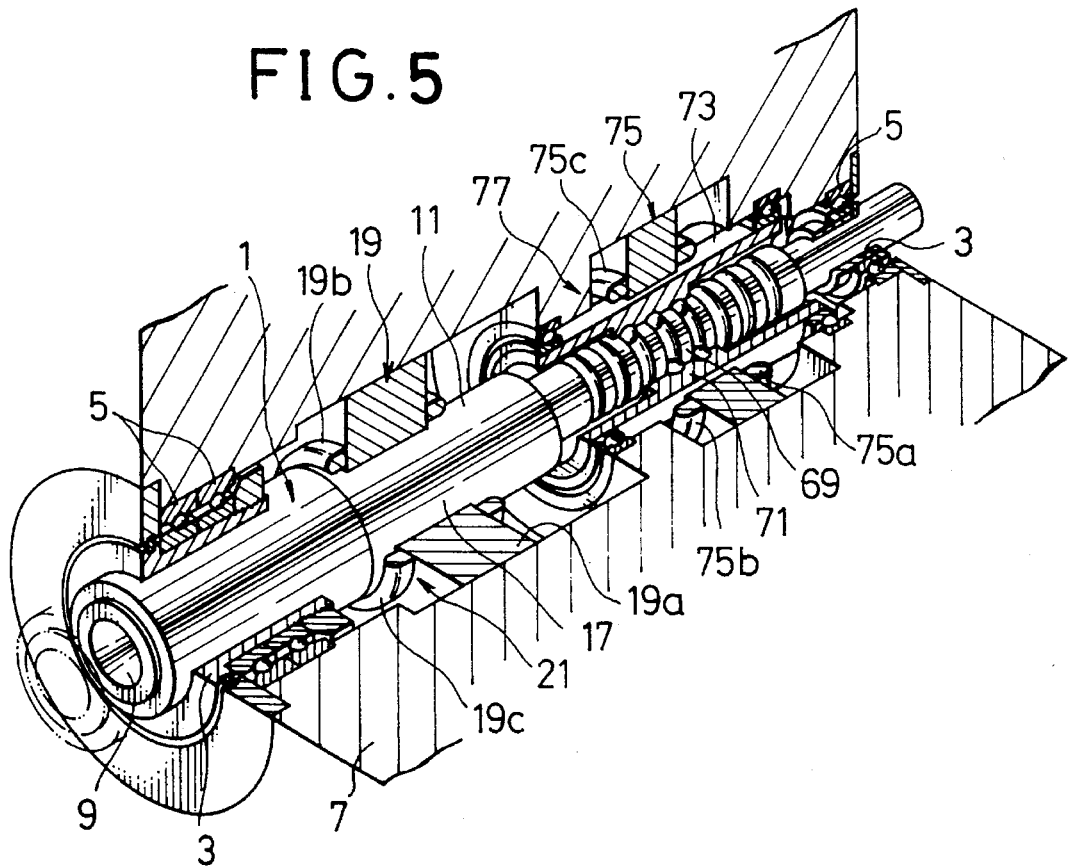
FIG. 5 is a partially cross-sectional perspective view showing the fourth embodiment of the present invention shown in FIG. 4.

FIGS. 4 and 5 show a fourth embodiment, in which the shaft rotation driving apparatus for a machine tool according to the present invention is applied to the spindle apparatus for a machine tool. Further, in FIGS. 4 and 5, the same reference numbers have been retained for the similar parts or elements which have the same functions as with the case of the first embodiment shown in FIG. 1.

In this embodiment, the rear end axle portion 11 of the main spindle 1 itself is formed as the magnetic anisotropic rotor 17; and the stator 19 including the magnetic core 19a, the armature winding 19b and the field winding 19c is fixedly disposed coaxially along the outer circumference of the magnetic anisotropic rotor 17 at such a position as to enclose the magnetic anisotropic rotor 17, so that a synchronous spindle rotation driving motor 21 can be constructed by the magnetic anisotropic rotor 17 and the stator 19 in the same way as with the case of the first to third embodiments.

In this embodiment, the axial length Lr of the magnetic anisotropic rotor 17 is determined longer than the axial length Ls of the stator 19. Accordingly, the magnetic anisotropic rotor 17 is always enclosed by the stator 19, irrespective of the axial movement of the main spindle 1, thus maintaining the construction of the spindle rotation driving motor 21, even if the main spindle 1 is moved along the axial direction thereof.

Further, another synchronous axle feeding motor 77 of magnetic anisotropic type is additionally formed at the rearmost end portion 67 of the main spindle 1. That is, a feed screw axle 69 (e.g., a spindle feeding ball screw axle) is formed at the rear end portion 67 of the main spindle 1, and a feed nut member 71 (e.g., a ball nut member) is engaged with the feed screw axle 69.

The feed nut member 71 itself is formed as another magnetic anisotropic rotor 73 provided with magnetic anisotropic characteristics (e.g., magnetic anisotropic slits are formed).

Further, another stator 75 is fixedly disposed coaxially along the outer circumference of the magnetic anisotropic rotor 73, that is, at such a position as to enclose the magnetic anisotropic rotor 73 (i.e., the feed nut member 71) so that an additional synchronous axle (spindle) feeding motor 77 can be constructed by the magnetic anisotropic rotor 73 and the stator 75.

The stator 75 is provided with an iron (magnet) core 75a, an armature winding 75b, and a field winding 75c (magnetizing means) for magnetizing the magnetic anisotropic rotor 73.

In the above-mentioned construction of the spindle rotation driving apparatus, since the spindle rotation driving motor 21 having the main spindle 1 itself as the magnetic anisotropic rotor 17 is constructed around the axis of the main spindle 1, the main spindle 1 can be directly rotated and driven by this spindle rotation driving motor 21. Further, the feed nut member 71 can be directly rotated by the axle feeding motor 77 having the feed nut member 71 itself as the magnetic anisotropic rotor 73.

When the spindle rotation driving motor 21 and the axle feeding motor 77 are both rotated in the same direction at the same speed, since the feed screw axle 69 and the feed nut member 71 are not rotatably displaced relative to each other, only the main spindle 1 is rotated, without being moved in the axial direction thereof.

When the axle feeding motor 77 is rotated in the same direction as the main spindle motor 21 at a speed lower than that of the spindle rotation driving motor 21, since the feed screw axle 69 is rotatably displaced in the forward direction relative to the feed nut member 71, the main spindle 1 is shifted in the forward (leftward, in FIG. 4) direction by two rotative forces of the two synchronous motors 21 and 77 (referred to as forward spindle feed).

In contrast with this, when the axle feeding motor 77 is rotated in the same direction as the spindle rotation driving motor 21 at a speed higher than that of the spindle rotation driving motor 21, since the feed screw axle 69 is rotatably displaced in the reverse direction relative to the feed nut member 71, the main spindle 1 is shifted in the reverse (rightward, in FIG. 4) direction by two rotative forces of the two synchronous motors 21 and 77 (referred to as reverse spindle feed).

The feed speed of the main spindle 1 can be finely adjusted quantitatively on the basis of a difference in rotative speed between the axle feeding motor 77 and the spindle rotation driving motor 21.

Further, in this embodiment, the spindle moving mechanism composed of both the axle feeding motor 77 and the spindle rotation driving motor 21 is provided for the main spindle 1 together. Without being limited thereto, however, it is also possible to provide these two motors 77 and 21 for a rotary sleeve fitted to the main spindle in the same way as above.

(Fifth Embodiment)

Figure 6:
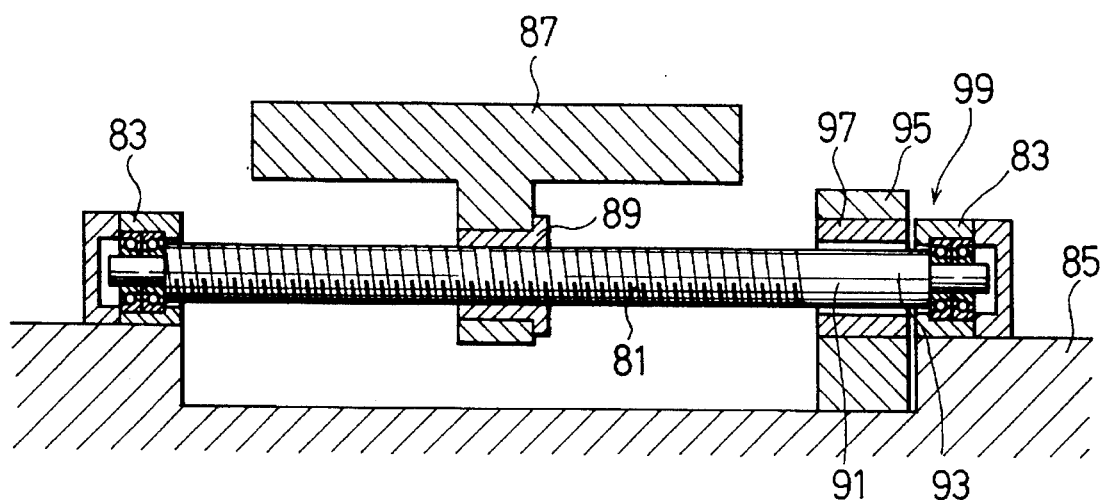
FIG. 6 is a diagrammatical cross-sectional view showing a fifth embodiment, in which the shaft rotation driving apparatus for a machine tool according to the present invention is applied to a screw shaft driven feeding device.

FIG. 6 shows a fifth embodiment, in which the shaft rotation driving apparatus for a machine tool according to the present invention is applied to a feed device composed of a nut member and a feed screw shaft. In FIG. 6, a feed screw shaft 81 is rotatably supported on a fixed-side member 85 via two bearings 83 on both ends thereof, respectively. A feed nut member 89 fixed to a movable carriage 87 is engaged with the feed screw shaft 81.

Therefore, when the feed screw shaft 81 is rotated, the movable carriage 87 can be moved in the axial direction of the feed screw shaft 81, that is, in both right and left directions in FIG. 6 on the basis of the engagement relationship between the feed screw shaft 81 and the feed nut member 89.

The end portion 91 of the feed screw shaft 81 itself is formed as a magnetic anisotropic rotor 93 provided with magnetic anisotropic characteristics (e.g., magnetic anisotropic slits are formed).

Further, a stator 97 is fixedly supported by a supporting member 95 coaxially along the outer circumference of the rotor 93, that is, at such a position as to enclose the magnetic anisotropic rotor 93, so that a synchronous feed screw shaft rotation driving motor 99 can be constructed by the magnetic anisotropic rotor 93 and the stator 97.

The stator 97 is provided with an iron (magnet) core, an armature winding, and a field winding (magnetizing means) for magnetizing the magnetic anisotropic rotor 93.

In the above-mentioned construction, since the feed screw shaft rotation driving motor 99 having the feed screw shaft 81 itself as the magnetic anisotropic rotor 93 is constructed around the axis of the feed screw shaft 81, the feed screw shaft 81 can be directly rotated by the feed screw shaft rotation driving motor 99, so that the movable carriage 87 can be moved in the right and left directions in FIG. 6.

(Sixth Embodiment)

Figure 7:
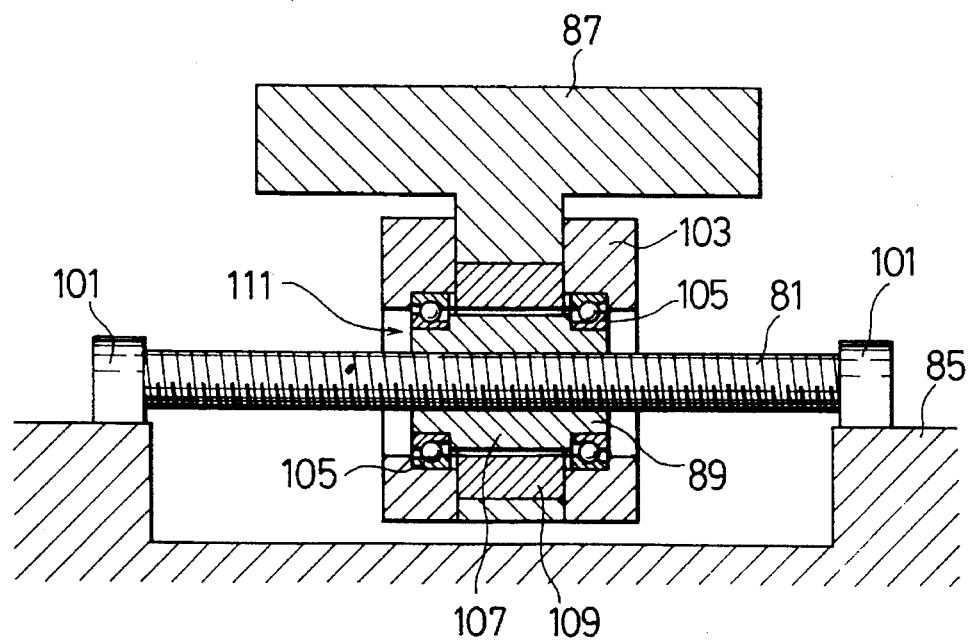
FIG. 7 is a diagrammatical cross-sectional view showing a sixth embodiment, in which the shaft rotation driving apparatus for a machine tool according to the present invention is applied to a nut member driven type feeding device.

FIG. 7 shows a sixth embodiment, in which the shaft rotation driving apparatus for a machine tool according to the present invention is applied to a feed device composed of a nut member and a feed screw shaft. In FIG. 7, the same reference numerals have been retained for similar parts or elements which have the same functions as with the case of the embodiment shown in FIG. 6.

In FIG. 7, a feed screw shaft 81 is fixedly supported on a fixed side member 85 via two brackets on both ends thereof, respectively. That is, the feed screw shaft 81 is fixed to the fixed side member 85.

Further, a bearing casing 103 is attached to a movable carriage 87, and a feed nut member 89 is rotatably supported by the bearing casing 103 via two bearings 105.

Therefore, when the feed nut member 89 is rotated, the movable carriage 87 can be moved in the axial direction of the feed screw shaft 81, that is, in both right and left directions in FIG. 7 on the basis of the engagement relationship between the feed screw shaft 81 and the feed nut member 89.

The feed nut member 89 itself is formed as a magnetic anisotropic rotor 107 provided with magnetic anisotropic characteristics (e.g., magnetic anisotropic slits are formed).

Further, a stator 109 is fixedly supported by the bearing casing 103 coaxially along the outer circumference of the magnetic anisotropic rotor 107, that is, at such a position as to enclose the rotor 107, so that a synchronous feed nut rotation driving motor 111 can be constructed by the magnetic anisotropic rotor 107 and the stator 109.

In this embodiment, the stator 95 is provided with an iron (magnet) core, an armature winding, and a field winding (magnetizing means) for magnetizing the magnetic anisotropic rotor 107.

In the above-mentioned construction, since the feed nut rotation driving motor 111 having the feed nut member 89 itself as the magnetic anisotropic rotor 107 is constructed around the axis of the feed nut member 89, the feed nut member 89 can be directly rotated by the feed nut rotation driving motor 111, so that the movable carriage 87 can be moved in the right and left directions in FIG. 7.

(Seventh Embodiment)

Figure 8:
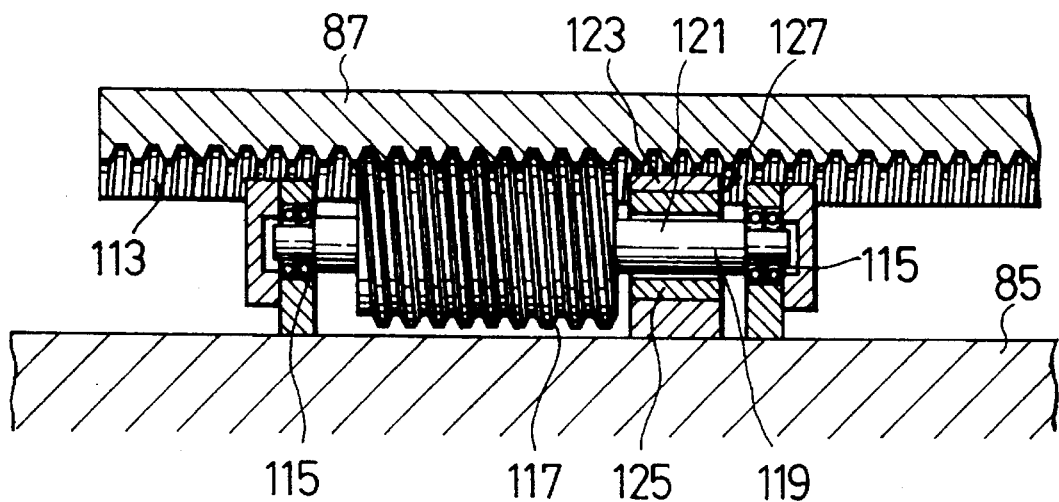
FIG. 8 is a diagrammatical cross-sectional view showing a seventh embodiment, in which the shaft rotation driving apparatus for a machine tool according to the present invention is applied to a worm driven type feeding device.

FIG. 8 shows a seventh embodiment, in which the shaft rotation driving apparatus for a machine tool according to the present invention is applied to a feed device composed of a worm rack member and a worm. In FIG. 8, the same reference numerals have been retained for similar parts or elements which have the same functions as with the case of the embodiment shown in FIG. 6.

In FIG. 8, a worm rack member 113 of a circular arc-shape in cross section is fixed to a lower bottom surface of a movable carriage 87 so as to extend in the axial direction of the carriage 87. Further, a worm 117 is rotatably supported on a fixed side member 85 via two bearings 115. The worm 117 is geared with the worm rack member 113.

Therefore, when the worm 117 is rotated around its own axis, the movable carriage 87 can be moved in the extending direction of the worm rack member 113, that is, in both right and left directions in FIG. 8 on the basis of the engagement relationship between the worm 117 and the worm rack member 113.

An axle portion 119 of the worm 117 itself is formed as a magnetic anisotropic rotor 121 provided with magnetic anisotropic characteristics (e.g., magnetic anisotropic slits are formed). Further, a stator 125 is fixedly supported by the supporting member 123 coaxially along the outer circumference of the magnetic anisotropic rotor 121, that is, at such a position as to enclose the rotor 121, so that a synchronous worm rotation driving motor 127 can be constructed by the magnetic anisotropic rotor 121 and the stator 125.

In this embodiment, the stator 125 is provided with an iron (magnet) core, an armature winding, and a field winding (magnetizing means) for magnetizing the magnetic anisotropic rotor 121.

In the above-mentioned construction, since the worm rotation driving motor 127 having the axle portion 119 of the worm 117 itself as the magnetic anisotropic rotor 121 is constructed around the axis of the axle portion 119 of the worm 117, the worm 117 can be directly rotated by the worm rotation driving motor 127, so that the movable carriage 87 can be moved in the right and left directions in FIG. 8.

Further, the above-mentioned construction of the feed device composed of a worm and a worm rack member can be applied to the feed device composed of a pinion and a rack member in quite the same way. That is, in the case of the feed device composed of the pinion and the rack member, the rack member is attached to the lower bottom surface of the movable carriage; the axle portion of the pinion itself geared with the rack member is formed as the magnetic anisotropic rotor; and a stator is fixedly disposed at such a position as to enclose the magnetic anisotropic rotor.

In the above description, although the invention has been described of its specific embodiments, without being limited to only these embodiments, it is understood by those skilled in the art that the foregoing description is only preferred embodiments of the disclosed apparatus and various changes and modifications may be made in the invention without departing from the spirit and scope thereof.

What is claimed is:

1. A shaft rotation apparatus for a machine tool having a main spindle for rotating a tool or a workpiece, comprising:

a first rotor integral with the main spindle, said first rotor being of magnetic anisotropy;

a first stator disposed coaxially along an outer circumference of said first rotor;

a first field winding wound around said first stator, for magnetizing said first rotor in a predetermined direction;

a first armature winding wound around said first stator, for providing a rotative force to said first rotor;

a feed screw axle portion integrally formed with the main spindle;

a second rotor having a feed nut geared with said feed screw axle portion, said second rotor being of magnetic anisotropy;

a second stator disposed coaxially along an outer circumference of said second rotor;

a second field winding wound around said second stator, for magnetizing said second rotor in a predetermined direction; and a second armature winding wound around said second stator, for providing a rotative force to said second rotor, wherein the main spindle is movable in an axial direction relative to said first stator, and said first rotor extends over a length corresponding to a movement stroke of the main spindle.

2. The shaft rotation apparatus of claim 1, wherein the main spindle includes a rotary sleeve, and both the first rotor and the feed screw axle are formed integral with the rotary sleeve.

* * * * *